US011986683B2

(12) United States Patent
Allinger et al.

(10) Patent No.: US 11,986,683 B2
(45) Date of Patent: May 21, 2024

(54) METHOD FOR OPERATING A RESCUE SYSTEM WITH A MOBILE RESCUE DEVICE

(71) Applicant: WEBER-HYDRAULIK GMBH, Losenstein (AT)

(72) Inventors: Patrick Allinger, Steyr (AT); Hanno Diekmann, Vaihingen/Enz (DE); Josef Eder, Schiedlberg (AT)

(73) Assignee: WEBER-HYDRAULIK GMBH, Losenstein (AT)

( * ) Notice: Subject to any disclaimer, the term of this patent is extended or adjusted under 35 U.S.C. 154(b) by 667 days.

(21) Appl. No.: 17/194,415

(22) Filed: Mar. 8, 2021

(65) Prior Publication Data

US 2021/0283429 A1    Sep. 16, 2021

(30) Foreign Application Priority Data

Mar. 10, 2020   (AT) .............................. A 50196/2020

(51) Int. Cl.
*A62B 3/00* (2006.01)
*G06F 8/65* (2018.01)
*H04W 4/02* (2018.01)
*H04W 4/80* (2018.01)

(52) U.S. Cl.
CPC ................ *A62B 3/005* (2013.01); *G06F 8/65* (2013.01); *H04W 4/025* (2013.01); *H04W 4/80* (2018.02)

(58) Field of Classification Search
CPC .......... A62B 3/005; H04W 4/80; H04W 4/90; B25F 5/00
See application file for complete search history.

(56) References Cited

U.S. PATENT DOCUMENTS

| 7,568,372 | B1* | 8/2009 | Patton .................... A62B 3/005 72/464 |
| 9,467,862 | B2 | 10/2016 | Zeiler et al. |
| 10,769,315 | B2 | 9/2020 | Velusamy et al. |
| (Continued) | | | |

FOREIGN PATENT DOCUMENTS

| AT | 520046 A1 | 12/2018 |
| DE | 102008000973 A1 | 10/2009 |
| (Continued) | | |

OTHER PUBLICATIONS

XP054979663, Killerdrone! Flying chainsaw, published Mar. 31, 2016 (https://www.youtube.com/watch?v=6Viwwetf0gU).

(Continued)

*Primary Examiner* — Mohammad Ali
*Assistant Examiner* — Dhruvkumar Patel
(74) *Attorney, Agent, or Firm* — Collard & Roe, P.C.

(57) ABSTRACT

A rescue system includes a mobile rescue device, in particular a spreading device, a cutting device, or a combined device having a spreading and a cutting function, including a base body with a handle, a working device arranged at the base body, a controller for controlling the work sequence of the working device, and an input device arranged at the base body for inputting control commands into the controller. Furthermore, an external additional input device is formed, which is structurally independent of the mobile rescue device and coupled or couplable with the controller of the mobile rescue device by a data transmission device.

16 Claims, 2 Drawing Sheets

(56) References Cited

U.S. PATENT DOCUMENTS

| | | |
|---|---|---|
| 10,854,054 B2 | 12/2020 | Esenwein et al. |
| 2005/0073389 A1 | 4/2005 | Chandley |
| 2007/0296589 A1 | 12/2007 | Cullum |
| 2009/0251330 A1 | 10/2009 | Gerold et al. |
| 2013/0109375 A1* | 5/2013 | Zeiler ............... G01S 19/16 455/552.1 |
| 2014/0107853 A1* | 4/2014 | Ashinghurst ......... B25F 5/00 700/297 |
| 2015/0286209 A1* | 10/2015 | Kreuzer ............. B25F 5/00 700/175 |
| 2017/0057040 A1* | 3/2017 | Rzasa ................. B25F 5/00 |
| 2017/0201853 A1* | 7/2017 | Chen ................. G05B 13/04 |
| 2017/0252911 A1 | 9/2017 | Barezzani et al. |
| 2018/0154537 A1* | 6/2018 | Lu .................. H04M 11/007 |
| 2018/0361559 A1 | 12/2018 | Bantle et al. |
| 2019/0027002 A1* | 1/2019 | Esenwein ........... H04W 4/021 |
| 2019/0053032 A1* | 2/2019 | Coulis ............... B25F 5/00 |
| 2019/0083821 A1* | 3/2019 | Sauerbier ........... A62B 3/005 |
| 2020/0043321 A1* | 2/2020 | Huggins ............ G08C 17/02 |
| 2022/0262274 A1* | 8/2022 | Kirchner ........... H04B 1/3888 |

FOREIGN PATENT DOCUMENTS

| | | | |
|---|---|---|---|
| DE | 10 2015 226 090 A1 | 6/2017 | |
| DE | 10 2016 201 497 A1 | 8/2017 | |
| DE | 10 2018 114 014 A1 | 12/2019 | |
| DE | 102019217341 A1 * | 5/2021 | |
| EP | 3009310 A1 * | 4/2016 | ............ B60R 21/26 |
| EP | 3 238 880 A1 | 11/2017 | |
| ES | 1 154 011 U | 4/2016 | |
| WO | 2017/190799 A1 | 11/2017 | |
| WO | 2018/227222 A1 | 12/2018 | |
| WO | 2019/058138 A1 | 3/2019 | |

OTHER PUBLICATIONS

XP054982360, Remote Control Chainsaw (Husqvarna 266xp), published on Oct. 6, 2010.

* cited by examiner

METHOD FOR OPERATING A RESCUE SYSTEM WITH A MOBILE RESCUE DEVICE

CROSS REFERENCE TO RELATED APPLICATIONS

Applicant claims priority under 35 U.S.C. § 119 of Austrian Application No. A 50196/2020 filed Mar. 10, 2020, the disclosure of which is incorporated by reference.

BACKGROUND OF THE INVENTION

1. Field of the Invention

The invention relates to a rescue system with a mobile rescue device and to a method for operating the rescue system.

2. Description of the Related Art

From AT 520046 A1, a mobile rescue device in its generic form is known. Such rescue devices are required to have a robust and thus simple structure on the one hand, and also to allow easy handling. On the other hand, the mobile rescue device is expected to offer numerous setting options in order to be adaptable to the complex requirements of a rescue mission. Up to now, it has not been possible to realize this combination of requirements in a mobile rescue device.

SUMMARY OF THE INVENTION

The object of the present invention was to overcome the disadvantages of the prior art and to provide a device and a method where all aforementioned advantages may be combined.

This object is achieved by a method and a device according to the claims.

According to the invention, a method for operating a rescue system with a mobile rescue device, in particular a spreading device, a cutting device, or a combined device having a spreading and a cutting function, is provided. The method comprises the method steps of:
 providing the mobile rescue device having a base body with a working means, a handle, a controller and an input means arranged at the base body;
 controlling the work sequence of the mobile rescue device by inputting control commands into the controller by means of the input means arranged at the base body. Via an external additional input means, by means of a data transmission means, external control commands are input into the controller, which control the work sequence of the working means in addition to the control commands input by means of the input means, or change the state of the mobile rescue device.

The method according to the invention has the advantage that control of the mobile rescue device may be influenced by means of the external additional input means; this way, the operator of the mobile rescue device may concentrate in the best possible way on their recovery operation during a rescue mission. At the same time, the external additional input means may be operated by an experienced individual, for example an officer-in-charge, who may maintain an overview of the recovery procedure. With these measures, working safety may be increased during recovery of an accident vehicle. Moreover, with these measures, rescue missions may be carried out in a more coordinated and fast manner, which may protect the life of the individuals stuck in the accident vehicle.

In particular, it is conceivable that the external additional input means may act on the mobile rescue device in real time or that data transmission between the external additional input means and the mobile rescue device may be carried out in real time.

It may also be appropriate if, by means of the additional input means, the work sequence of the mobile rescue device is interrupted although the input means has been actuated. This way, working safety may be further increased during operation of the mobile rescue device. In particular, it may thereby be achieved that the emergency personnel operating the mobile rescue device only has to concentrate on their assigned task. In the case of danger, for example if the vehicle skids down, an external individual maintaining an overview may intervene. Especially the interruption of the work sequence may constitute an important measure for increasing personal safety.

It may further be provided that by means of the additional input means, the work sequence speed of the mobile rescue device is adjusted. Especially in tricky situations or if multiple mobile rescue devices are used at the same time, it may be reasonable for working safety reasons if the work sequence speed is not only adjusted locally at the mobile rescue device but if, by means of the external additional input means, the work sequence speed may be additionally adjusted in a coordinated manner. This may be advantageous especially if the mobile rescue device is operated by individuals with little experience.

It may further be provided that multiple of the mobile rescue devices are coupled with the external additional input means, wherein the external control commands of the external additional input means simultaneously act on all mobile rescue devices coupled therewith. This way, when multiple mobile rescue devices are used, movement of the individual mobile rescue devices may be centrally coordinated during a rescue mission, and an individual who may maintain an overview of the overall situation may thus recognize and prevent any risks in the best possible way.

In an alternative embodiment, it is of course also conceivable that multiple of the mobile rescue devices are coupled with the external additional input means, wherein the external control commands of the external additional input means optionally only act on individual ones of the mobile rescue devices coupled therewith. In yet another embodiment, it is of course also conceivable that multiple of the mobile rescue devices are coupled with the external additional input means, wherein the external control commands of the external additional input means act on selectable groups of the mobile rescue devices coupled therewith.

Moreover, an embodiment is also advantageous according to which it may be provided that the mobile rescue device detects its position relative to an accident vehicle, wherein the work sequence of the mobile rescue device is carried out based on this position information. This may increase working safety during manipulation of an accident vehicle by the mobile rescue device not allowing any dangerous manipulations in potential danger zones. Thus, dangerous manipulation by means of the mobile rescue device may be prevented, for example in the vicinity of airbags that have not yet been deployed or the pressurized containers connected therewith, or in the vicinity of the batteries of an electric vehicle or live components of an electric vehicle. In particular, it may be provided in this regard that in the accident vehicle, transponders are arranged, by means of which the position information of the mobile rescue device relative to the accident vehicle may be detected. Such transponders may be RFID chips, for instance. The transponders may, for example, be arranged at the predetermined positions during manufacture of the vehicle. It is further also conceivable that the transponders are arranged at the vehicle subsequently, i.e. during the rescue mission, for example by an officer-in-charge. The mobile rescue device may be programed to have no or only limited functionality at a predefined distance to a particular transponder.

According to a further development, it is possible that state information of the accident vehicle is retrieved by the mobile rescue device and/or by the external additional input means, wherein the work sequence of the mobile rescue device is carried out based on this retrieved state information. This has the advantage that working safety may be further increased during recovery of the accident vehicle. If, for example, the power supply system of an accident vehicle is still live, this may influence the work sequence of the mobile rescue device. Especially in combination with the detection of the position of the mobile rescue device relative to the accident vehicle, the applications may be further increased. For example, the vicinity of an airbag where the mobile rescue device does not function at all or only to a limited extent may be recognized as being critical. If, however, the mobile rescue device receives the information that the airbag has already been deployed, full functionality of the mobile rescue device may also be provided in this previously critical area.

In particular, it is conceivable that the state information of the accident vehicle is not only retrieved by the external additional input means and directly influences the work sequence of the mobile rescue device, but that in addition, at the external additional input means, the operator of said external additional input means may be shown the state information of the accident vehicle, and the operator of the external additional input means is thus enabled to make further decisions based on this information that may increase working safety of the rescue workers.

It may further be advantageous if state information of the mobile rescue device, such as the battery capacity and/or maintenance cycles and/or error codes, are transmitted to the external additional input means and displayed by it, wherein the work sequence of the mobile rescue device is carried out based on this retrieved state information. This way, failure safety of the mobile rescue devices may be increased. If, for example, the battery capacity falls below a predeterminable level, the mobile rescue device may be automatically set into energy-saving mode by means of the external additional input means, which may extend battery life. Additionally, a warning may be placed on the external additional input means, so that the operator of the external additional input means may request a new battery or a new mobile rescue device. Moreover, maintenance of the mobile rescue device may be simplified with these measures.

Furthermore, it is also conceivable that by means of the external additional input means, certain predefined maximum forces that may be exerted by the mobile rescue device in its normal state are suspended at least for a short period of time, so that critical rescue missions may be completed in the best possible way while accepting the reduced service life of the mobile rescue device.

It may further be provided that at the external additional input means, control profiles are selectable, by means of which the sensitiveness of the input means or the assignment of multiple input means to particular groups of persons may be set. This way, the mobile rescue device may be easily adapted to requirements of particular groups of persons, which may further increase working safety. For example, it is conceivable that the mobile rescue device may thus be adapted to the requirements of left-handed or right-handed people. For example, it is further also conceivable that the mobile rescue device is thus adapted to the requirements of stronger or weaker individuals. It is further also conceivable that the mobile rescue device is thus adapted to the requirements of more experienced groups of persons or to the requirements of less experienced groups of persons.

It may further be provided that by means of the external additional input means, a lighting arranged at the mobile rescue device is controlled. This way, the work assignment may be facilitated for the operator of the mobile rescue device.

According to a special embodiment, it is possible to connect the external additional input means to the internet for updating the firmware of the controller of the mobile rescue device by means of the external additional input means. This way, the firmware of the mobile rescue device may always be kept up-to-date, so that further developments of the firmware of the mobile rescue device may be installed on the deployed mobile rescue devices in a timely and simple manner. In particular, it is also conceivable in this regard that the firmware of multiple of the mobile rescue devices is updated simultaneously or successively.

According to an advantageous further development, it may be provided that the global position of the mobile rescue device is detected, and that, as soon as the mobile rescue device is outside a predefined radius of movement, the mobile rescue device is locked and/or a message is transmitted to a predefined receiver, in particular that the predefined radius of movement is determined by means of the external additional input means. This way, the mobile rescue device may be disabled in the event of theft, so that no further criminal acts may be committed with the mobile rescue device, such as breaking a safe or cash machine. By means of the alternative or additional information transmitted to the predefined receiver, theft of the mobile rescue device may be timely reported to the police. Furthermore, it is also conceivable that the global position of the mobile rescue device may be displayed at the external additional input means, so that in the event of theft, the mobile rescue device may be localized easily. Especially if the predefined radius of movement is set or adjusted by means of the external additional input means, said theft protection may be deactivated during a large-scale operation or an assistance operation outside the usual radius of movement, so that the functionality of the mobile rescue device is available to the emergency personnel in this case as well. For this case, it may be provided that a security code must be entered into the external additional input means in order to deactivate the usual radius of movement and thus enable use of the mobile rescue device outside this usual radius of movement.

Moreover, it is also conceivable that after the mobile rescue device has been locked as described above, the latter can only be activated again by means of the external additional input means. In particular, it may be provided in this regard that entering a security code into the external additional input means is required for reactivating the disabled mobile rescue device and thus enable use of the mobile rescue device by its legitimate owner.

It is further also conceivable that the external additional input means must be activated in order to be used. This may be done by entering a code, for example. In another embodiment, it is also conceivable that the external additional input means may be activated by means of an electronic key, such as an RFID chip or by means of a smartphone, for example by means of NFC. In particular, it is also conceivable that individual activation codes or individual activation keys are assigned to a user or a user group, wherein it is possible to assign different authorization roles this way.

According to the invention, a rescue system is formed. The rescue system comprises:
- a mobile rescue device, in particular a spreading device, a cutting device, or a combined device having a spreading and a cutting function, comprising:
  a base body with a handle;
  a working means arranged at the base body;
  a controller for controlling the work sequence of the working means;
  an input means arranged at the base body for inputting control commands into the controller.

Furthermore, an external additional input means is formed, which is structurally independent of the mobile rescue device and coupled or couplable with the controller of the mobile rescue device by means of a data transmission means. In addition, a drive means is formed for driving the working means. It may further be provided that an energy storage or an energy supply apparatus is formed for supplying the energy required for the drive means.

The rescue system according to the invention has the advantage that control of the mobile rescue device may be influenced by means of the external additional input means; this way, the operator of the mobile rescue device may concentrate in the best possible way on their assigned recovery operation during a rescue mission. At the same time, the external additional input means may be operated by an experienced individual, for example an officer-in-charge, who may maintain an overview of the recovery procedure. With these measures, working safety may be increased during recovery of an accident vehicle. Moreover, with these measures, rescue missions may be carried out in a more coordinated and fast manner, which may protect the life of the individuals stuck in the accident vehicle.

It may further be provided that the data transmission means has a first transmission unit, which is coupled or couplable with a first reception unit, wherein the first reception unit is coupled with the controller, and that the data transmission means has a second transmission unit, which is coupled or couplable with a second reception unit, wherein the second reception unit is coupled with the controller. This way, sufficient redundancy of the data transmission means may be achieved in order to ensure sufficiently stable data transmission if one of the two transmission units fails. This may further increase working safety.

In addition, it may be provided that the first transmission unit and the second transmission unit have different transmission technologies, in particular that the first transmission unit is configured for direct transmission, such as Bluetooth or WLAN, and that the second transmission unit is configured for transmission via mobile radio. This way, the disadvantages of a single transmission technology may be balanced by the advantages of the additional and thus redundant transmission technology. If, for example, the external additional input means is too far away from the mobile rescue device for establishing a Bluetooth or WLAN connection, the data may be transmitted via mobile radio. If, however, the mobile rescue device is used in an area where the mobile radio network does not offer any or only limited connectivity, the data may be transmitted via direct transmission, such as Bluetooth or WLAN.

An embodiment is also advantageous according to which it may be provided that the external additional input means is configured as a tablet or a mobile phone for displaying state information of the mobile rescue device. This way, it is possible that a standard device, which is carried along by many rescue organizations anyway, serves as an external additional input means. By installing an app, functionality of the tablet or mobile phone as an external additional input means may be achieved.

In an alternative embodiment, it may also be provided that the external additional input means is specifically designed or built for this task and may thus have an interface customized for this task. In particular, it is also conceivable in this regard that, for example, specific buttons for important functions, such as an emergency stop, are formed at the external additional input device.

It is further also conceivable that the external additional input means is configured as smartglasses or a digital visor. Furthermore, it is also conceivable that smartglasses or a digital visor are formed in addition to an external additional input means formed as described above.

It is further also conceivable that the external additional input means has a vibration generator. By means of said vibration generator, the operator of the external additional input means may receive a haptic warning signal when a critical situation arises. It is further also conceivable that by means of said vibration generator, the operator receives a feedback on the entries made.

According to a further development, it is possible that the data transmission means of the external additional input means is configured for establishing a data transmission connection to an accident vehicle. This has the advantage that working safety may be further increased during recovery of the accident vehicle. If, for example, the power supply system of an accident vehicle is still live, this may influence the work sequence of the mobile rescue device. Especially in combination with the detection of the position of the mobile rescue device relative to the accident vehicle, the applications may be further increased. For example, the vicinity of an airbag where the mobile rescue device does not function at all or only to a limited extent may be recognized as being critical; if, however, the mobile rescue device receives the information that the airbag has already been deployed, full functionality of the mobile rescue device may also be provided in this previously critical area.

It may further be appropriate if the mobile rescue device has a local position detection means, by means of which the position of the mobile rescue device relative to an accident vehicle may be determined, in particular that the local position detection means is configured for detecting position determination objects arranged in the accident vehicle. This may increase working safety during manipulation of an accident vehicle by the mobile rescue device not allowing any dangerous manipulations in potential danger zones. Thus, dangerous manipulation by means of the mobile rescue device may be prevented, for example in the vicinity of airbags that have not yet been deployed or the pressurized containers connected therewith, or in the vicinity of the batteries of an electric vehicle or live components of an electric vehicle. In particular, it may be provided in this regard that in the accident vehicle, transponders are arranged, by means of which the position information of the mobile rescue device relative to the accident vehicle may be detected. Such transponders may be RFID chips, for instance. The transponders may be arranged at predetermined positions during manufacture of the vehicle, wherein the mobile rescue device may be programed to have no or only limited functionality at a predefined distance to a particular transponder.

Moreover, it may be provided that the mobile rescue device has a global position detection means, by means of which the geographic position of the mobile rescue device may be determined. This way, the mobile rescue device may be disabled in the event of theft, so that no further criminal acts may be committed with the mobile rescue device, such as breaking a safe. By means of the alternative or additional information transmitted to the predefined receiver, theft of the mobile rescue device may be timely reported to the police. Furthermore, it is also conceivable that the global position of the mobile rescue device may be displayed at the external additional input means, so that in the event of theft, the mobile rescue device may be localized easily. Especially if the predefined radius is set or adjusted by means of the external additional input means, said theft protection may be deactivated during a large-scale operation or an assistance operation outside the usual radius of movement, so that the functionality of the mobile rescue device is available to the emergency personnel in this case as well.

It may further be provided that a camera is arranged at the mobile rescue device, wherein the image information of the camera may be transmitted to the external additional input means. In particular, it may be provided that the image captured by the camera is shown on a display of the external additional input means. It is further also conceivable that during image display on the external additional input means, said image is supplemented with digital information, such as the position of position determination objects. The image display may thus be configured as an augmented reality representation.

A mobile rescue device within the meaning of this document is an electromechanical or electrohydraulic working device for portable use in rescue missions, such as a spreading device, a cutting device, or a combined device having a cutting and a spreading function, or a lifting cylinder (or rescue cylinder). Such rescue devices primarily serve for supporting rescue organizations performing recovery operations, such as fire departments, during their recovery missions, for example for recovering injured persons from accident vehicles. The rescue devices may of course also be used during recovery missions or securing missions in buildings.

It is further also conceivable that such a rescue device is used, for instance, by the police or a special forces unit or the military, for example for opening apartment doors. Especially during such missions, it may be important that the lighting of the working means is only activated when it is actually needed in order to remain undetected as long as possible. This later activation when required may be carried out by means of the external additional input means.

In particular, it may be provided that the drive means is configured as a hydraulic cylinder. A drive means formed in this manner may be supplied with hydraulic fluid by a hydraulic unit, for example. In this regard, the hydraulic unit may be formed separately from the mobile rescue device and coupled with the mobile rescue device by means of a hydraulic hose.

To enable self-sufficient operation independent of power generators or power grids, the hydraulic units for activating the working means may be increasingly operated by electrochemical energy storages, in particular by batteries. It is further also conceivable that the drive means are directly configured as electric motors.

Generic battery-powered hydraulic units for hydraulic rescue tools, which hydraulic units are supposed to be portable and operable by only one person, are available from the applicant in numerous versions. The mobile rescue device may be operated and appropriately used by only one person by means of handles or grip sections which are attached at a base body as ergonomically as possible.

The data transmission means for coupling the external additional input means with the input means arranged at the base body may be wired or wireless. For better understanding of the invention, the latter is explained in detail with reference to the following figures.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

First of all, it should be noted that in the embodiments described in different ways, identical parts are given identical reference numbers or identical component names, and the disclosures contained in the entire description may be correspondingly applied to identical parts with identical reference numbers or identical component names. Moreover, the position indications used in the description, such as at the top, at the bottom, lateral, etc. directly refer to the figure shown and described, and, if a position changes, said position indications are to be correspondingly applied to the new position.

Figure 1:
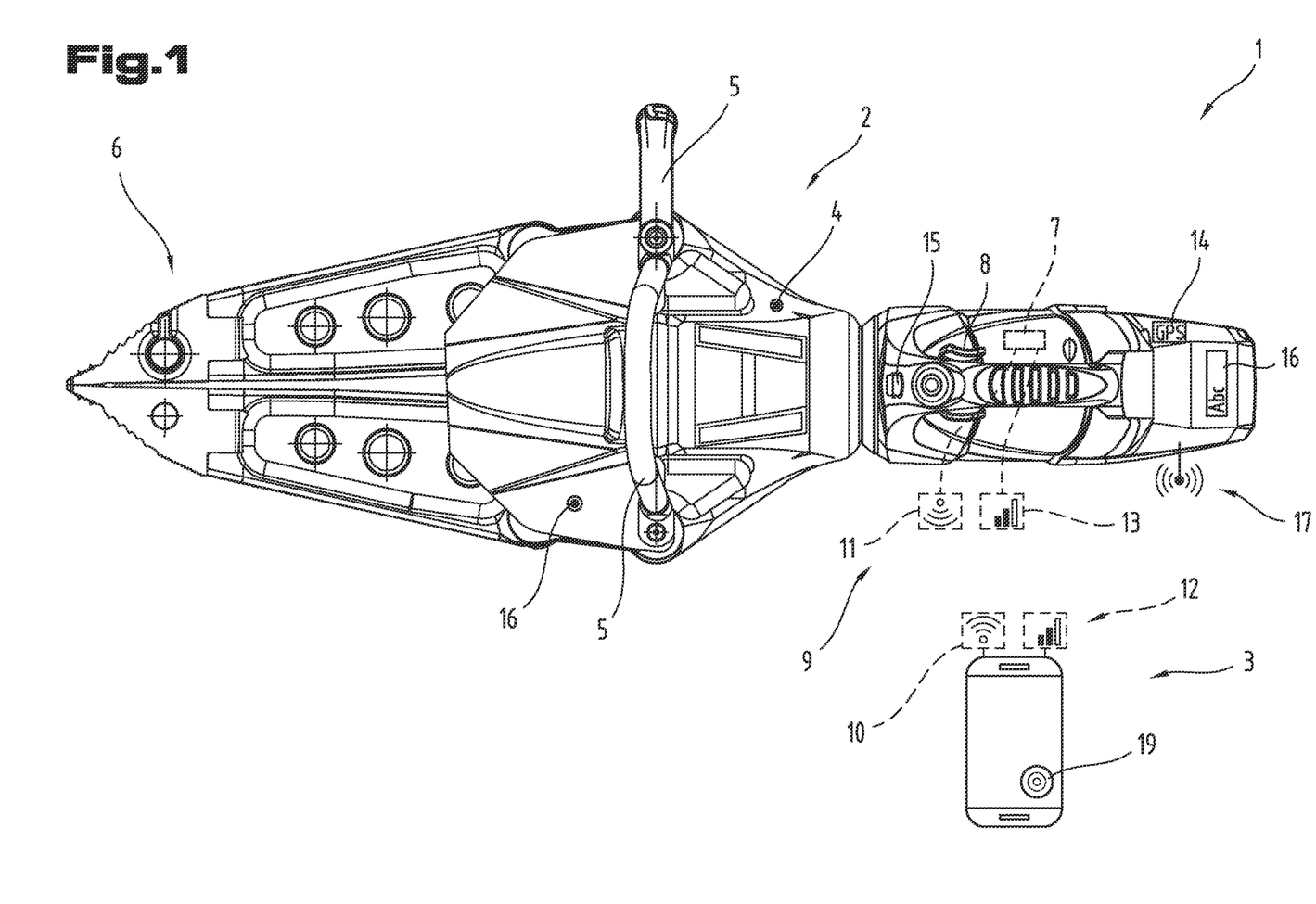
FIG. 1 shows a schematic representation of a first embodiment of a rescue system with a mobile rescue device and an external additional input means.

FIG. 1 shows a first embodiment of a rescue system 1 with a mobile rescue device 2 and an external additional input means 3. The mobile rescue device 2 comprises a base body 4 at which a handle 5 may be arranged and at which working means 6 are arranged for manipulation during the rescue mission. In addition, the mobile rescue device 2 comprises a controller 7, which is coupled with an input means 8. By means of the controller 7, control commands, which are entered by a device operator by means of the input means 8, are converted into corresponding signals in order to be able to move the working means 6 of the mobile rescue device 2.

Moreover, the mobile rescue device 2 comprises an energy supply unit, for example in the form of a battery, and a drive unit, for example in the form of an electric motor.

The mobile rescue device 2 of the present embodiment is configured as a battery-operated mobile rescue device. In another embodiment, which is not shown, it is of course also conceivable that the mobile rescue device 2 has a base body 4, which is coupled with an external drive unit by means of a hydraulic hose, for example.

The rescue device 1 further comprises a data transmission means 9, by means of which data may be transmitted from the external additional input device 3 to the controller 7 of the mobile rescue device 2. As can be seen from the present embodiment according to FIG. 1, the data transmission means 9 may be configured as a wireless data transmission means 9. In an alternative embodiment, which is not shown, it is of course also conceivable that the external additional input means 3 is coupled with the mobile rescue device 2 by means of a wired data transmission means 9.

As can further be seen from FIG. 1, it may be provided that the data transmission means 9 has a first transmission unit 10, which is coupled with the external additional input means 3. In addition, the data transmission means 9 may have a first reception unit 11, which is coupled with the controller 7 of the mobile rescue device 2. Analogously, a second transmission unit 12 may be formed, which is coupled with the external additional input means 3 and interacts with a second reception unit 13, which is coupled with the controller 7 of the mobile rescue device 2.

As data transmission may not only be carried out in one direction but bidirectionally, it is of course also conceivable that the transmission units 10, 12 receive data packets sent by the reception units 11, 13. Moreover, it may be provided that the mobile rescue device 2 has a global position detection means 14, by means of which the geographic position of the mobile rescue device 2 may be determined.

Moreover, it may be provided that the mobile rescue device 2 has a lighting 15 for illuminating the working area during work with the mobile rescue device 2. In particular, it may be provided that the lighting 15 is directed at the working means 6 so as to be able to illuminate them properly. It may further be provided that the lighting 15 may be switched on and off directly at the mobile rescue device 2 by means of an input means 8. Of course, it is also conceivable in this regard that a separate input means 8 is formed for switching on the lighting 15. In an additional embodiment, it may be provided that the lighting 15 may be switched on and off by means of the external additional input means 3.

It is further also conceivable that the mobile rescue device 2 has an information display 16. The information display 16 may, for example, be arranged at the base body 4 of the mobile rescue device 2. As can be seen from FIG. 1, the information display 16 may be configured as a display on which a freely selectable text or symbols may be shown.

In an alternative embodiment, it is also conceivable that the information display 16 is configured as a simple display means, which is configured as a light, for example.

By means of the information display 16, the operator of the mobile rescue device 2 may, for example, be shown the battery status or other information.

In a further development, it is also conceivable that by means of the external additional input means 3, information is transmitted to the mobile rescue device 2 and displayed by means of the information display 16. It is thus conceivable, for example, that the group commander of a rescue team who is the operator of the external additional input means 3 transmits a message to the information display 16 by means of the external additional input means 3, for example to inform the operator(s) of the rescue device 2 of the current rescue situation.

It is further conceivable that the mobile rescue device 2 has a local position detection means 17 for detecting the relative position or relative orientation of the mobile rescue device 2 to one or multiple position determination objects 18.

As can be seen from the schematic representation according to FIG. 1, it may be provided that the external additional input means 3 is configured as a tablet or a mobile phone. In a device configured as external additional input means 3 specifically for this purpose, it is also conceivable that said specifically configured device has input buttons for inputting commands into the external additional input means 3. For example, it may be provided that at the external additional input means 3, an emergency stop button 19 is formed, by means of which the work sequence of the mobile rescue device 2 may be stopped if necessary.

It is further also conceivable that the operating data of the mobile rescue device 2 is transmitted to the external additional input means 3 and stored by the latter. The operating data of the mobile rescue device 2 may be read out periodically and used for further data processing purposes. It is further also conceivable that the operating data of the mobile rescue device 2 is transmitted to the external additional input means 3 and periodically or continuously transmitted to a central server via a data connection interface. It is conceivable in this regard that the operating data of the mobile rescue device are used for developing new mobile rescue devices, in particular for simulating the life cycle of a new mobile rescue device in order to be able to scale the new mobile rescue devices to be constructed with sufficient strength in the construction phase so as to improve failure safety of the mobile rescue devices to be constructed. In particular, it is advantageous in this regard if the position of the mobile rescue device 2 or the load occurring in the individual positions is recorded by means of the external additional input means 3 so as to achieve improved operator ergonomics and efficiency during a rescue mission based on these calculations.

Figure 2:
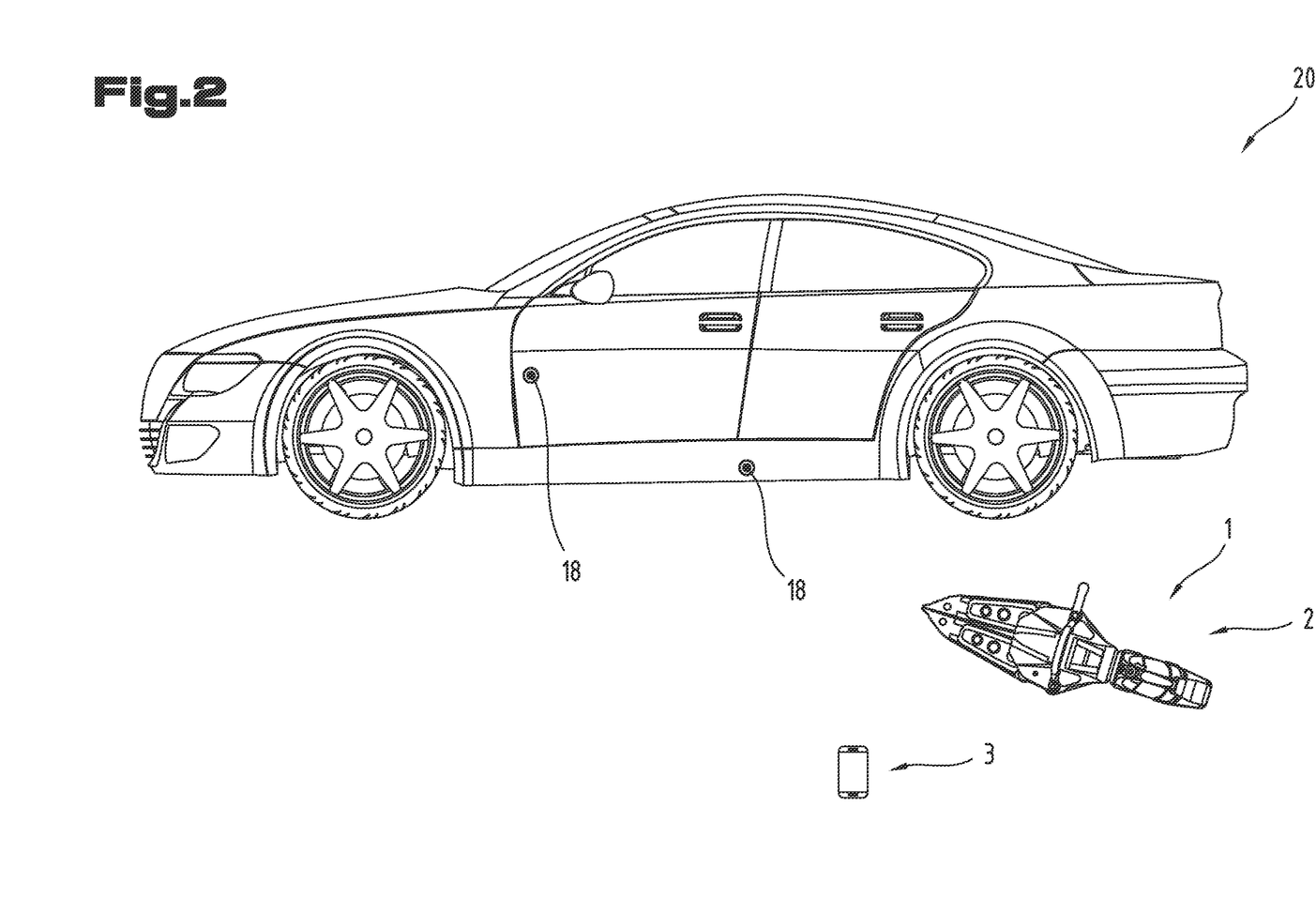
FIG. 2 shows a schematic representation of a first embodiment of a vehicle and the rescue system.

FIG. 2 shows a schematic representation of a first embodiment of a vehicle 20 where the rescue system 1 may be used for rescuing individuals stuck in the vehicle 20 or for recovering the accident vehicle 20. As can be seen from FIG. 2, it may be provided that one or multiple of the position determination objects 18 are arranged at the vehicle 20, which interact with the local position detection means 17 of the mobile rescue device 2. For example, it is conceivable that one of the position determination objects 18 is arranged in the area of the vehicle battery, wherein the function of the mobile rescue device 2 may be disabled if it is within a certain vicinity of said position determination object 18.

The embodiments show possible variations; however, it should be noted at this point that the invention is not limited to its variations specifically shown; rather, various combinations of the individual variations are possible, and this variation possibility based on the technical teaching of the present invention is subject to the skills of the person skilled in the art active in this technical field.

The scope of protection is determined by the claims. However, the description and the drawings are to be used for construing the claims. The individual features or feature combinations of the different embodiments shown and described may constitute independent inventive solutions. The object underlying the independent inventive solutions may be gathered from the description.

All indications of ranges of values in the present description are to be understood such that they also include any and all sub-ranges therefrom; for example, the indication 1 to 10 is to be understood such that all sub-ranges are included, starting at the lower limit 1 up to the upper limit 10, i.e. all sub-ranges start with a lower limit of 1 or larger and end at an upper limit of 10 or less, e.g. 1 to 1.7, or 3.2 to 8.1, or 5.5 to 10.

As a matter of form, it should finally be noted that for better understanding of the structure, some of the elements have been represented unscaled and/or enlarged and/or in reduced size.

Although only a few embodiments of the present invention have been shown and described, it is to be understood that many changes and modifications may be made thereunto without departing from the spirit and scope of the invention.

LIST OF REFERENCE NUMBERS

1 Rescue system
2 Mobile rescue device
3 External additional input means
4 Base body
5 Handle
6 Working means
7 Controller
8 Input means
9 Data transmission means
10 First transmission unit
11 First reception unit
12 Second transmission unit
13 Second reception unit
14 Global position detection means
15 Lighting
16 Information display
17 Local position detection means
18 Position determination object
19 Emergency stop button
20 Vehicle

What is claimed is:

1. A method for operating a rescue system with a mobile rescue device comprising the following method steps:
   providing the mobile rescue device having a base body with a working means, a handle, a controller and an input device arranged at the base body;
   controlling a work sequence of the mobile rescue device by inputting control commands into the controller by means of using the input means device arranged at the base body;
   wherein via an external additional input means, external control commands are input using a data transmission means into the controller, wherein the external control commands control the work sequence of the working means in addition to the control commands input using the input means device, or change a state of the mobile rescue device;
   wherein the external additional input means acts on the mobile rescue device in real time such that an emergency personnel can operate the mobile rescue device by using the input device arranged at the base body and
   an external individual maintaining an overview may intervene via the external additional input means such that the work sequence of the mobile rescue device is interrupted although the input device has been actuated or
   a work sequence speed of the mobile rescue device is adjusted.

2. The method according to claim 1,
   wherein a plurality of the mobile rescue devices are coupled with the external additional input means; and
   wherein the external control commands of the external additional input means simultaneously act on all mobile rescue devices coupled therewith.

3. The method according to claim 1,
   wherein the mobile rescue device detects its position relative to an accident vehicle; and
   wherein the work sequence of the mobile rescue device is carried out based on this position information.

4. The method according to claim 3,
   wherein state information of the accident vehicle is retrieved by the mobile rescue device and/or by the external additional input means; and
   wherein the work sequence of the mobile rescue device is carried out based on this retrieved state information.

5. The method according to claim 1,
   wherein state information of the mobile rescue device are transmitted to and displayed by the external additional input means; and
   wherein the work sequence of the mobile rescue device is carried out based on this retrieved state information.

6. The method according to claim 1, wherein at the external additional input means, control profiles are selectable, wherein sensitivity of the input device may be set or multiple input device to particular groups of persons may be set assigned using the control profiles.

7. The method according to claim 1, wherein using the external additional input means, a lighting arranged at the mobile rescue device is controlled.

8. The method according to claim 1, wherein the external additional input means is connected to an internet for updating firmware of the controller of the mobile rescue device using the external additional input means.

9. The method according to claim 1,
   wherein a global position of the mobile rescue device is detected; and
   wherein, as soon as the mobile rescue device is outside a predefined radius of movement, the mobile rescue device is locked and/or a message is transmitted to a predefined receiver.

10. A rescue system, comprising:
    a mobile rescue device comprising:
    a base body with a handle;
    a working means arranged at the base body;
    a controller for controlling a work sequence of the working means;
    an input means device arranged at the base body for inputting control commands into the controller;
    wherein an external additional input means is formed, which is structurally independent of the mobile rescue device and coupled or couplable with the controller of the mobile rescue device using a data transmission means;
    wherein the external additional input means acts on the mobile rescue device in real time such that an emergency personnel can operate the mobile rescue device by using the input device arranged at the base body and
    an external individual maintaining an overview may intervene via the external additional input means such that
    the work sequence of the mobile rescue device is interrupted although the input device has been actuated or
    a work sequence speed of the mobile rescue device is adjusted.

11. The rescue system according to claim 10,
    wherein the data transmission means has a first transmission unit 44 which is coupled or couplable with a first reception unit;
    wherein the first reception unit is coupled with the controller;
    wherein the data transmission means has a second transmission unit, which is coupled or couplable with a second reception unit wherein the second reception unit is coupled with the controller.

12. The rescue system according to claim 11, wherein the first transmission unit 404 and the second transmission unit have different transmission technologies, wherein the first transmission unit is configured for direct transmission, and wherein the second transmission unit is configured for transmission via mobile radio.

13. The rescue system according to claim 10, wherein the external additional input means is configured as a tablet or a mobile phone for displaying state information of the mobile rescue device.

14. The rescue system according to claim 10, wherein the data transmission means of the external additional input means is configured for establishing a data transmission connection to an accident vehicle.

15. The rescue system, according to claim 10, wherein the mobile rescue device has a position sensor configured for detecting position determination objects arranged in the accident vehicle.

16. The rescue system according to claim 10, wherein the mobile rescue device has global positioning system configured to determine a geographic position of the mobile rescue device.

* * * * *

UNITED STATES PATENT AND TRADEMARK OFFICE
CERTIFICATE OF CORRECTION

| | | |
|---|---|---|
| PATENT NO. | : 11,986,683 B2 | Page 1 of 1 |
| APPLICATION NO. | : 17/194415 | |
| DATED | : May 21, 2024 | |
| INVENTOR(S) | : Patrick Allinger et al. | |

It is certified that error appears in the above-identified patent and that said Letters Patent is hereby corrected as shown below:

In the Claims

In Column 11, Lines 37-38 (Lines 7-8 of Claim 1), delete "by means of"

In Column 11, Line 38 (Line 8 of Claim 1), change "input means device" to --input device--

In Column 11, Line 45 (Line 15 of Claim 1), after "input" delete "means"

In Column 12, Line 17 (Line 5 of Claim 6), before "assigned" delete "set"

In Column 12, Line 38 (Line 7 of Claim 10), after "input" delete "means"

In Column 12, Line 57 (Line 3 of Claim 11), after "unit" add --,-- and delete "44"

In Column 12, Line 66 (Line 2 of Claim 12), before "and" delete "404"

Signed and Sealed this
Nineteenth Day of November, 2024

Katherine Kelly Vidal
*Director of the United States Patent and Trademark Office*